United States Patent [19]

Breslich, Jr. et al.

[11] Patent Number: 4,817,453

[45] Date of Patent: Apr. 4, 1989

[54] FIBER REINFORCED CENTRIFUGE ROTOR

[75] Inventors: Francis N. Breslich, Jr.; John H. Laakso, both of Seattle, Wash.

[73] Assignee: E. I. DuPont de Nemours and Company, Wilmington, Del.

[21] Appl. No.: 148,210

[22] Filed: Jan. 22, 1988

Related U.S. Application Data

[63] Continuation of Ser. No. 805,708, Dec. 6, 1985, abandoned.

[51] Int. Cl.$^4$ .................. F16F 15/10; G05G 1/00; G05G 3/00
[52] U.S. Cl. ......................... 74/572; 74/574; 494/16; 494/81
[58] Field of Search ............... 74/572, 573 R, 573 F, 74/574; 494/16, 81, 82

[56] References Cited

U.S. PATENT DOCUMENTS

| | | | |
|---|---|---|---|
| D. 231,924 | 6/1974 | Pollard | D24/1.99 |
| D. 231,981 | 7/1974 | Paulsen | D24/2.99 |
| 477,324 | 6/1892 | Coburn | |
| 618,196 | 1/1899 | Ashworth et al. | |
| 1,906,925 | 5/1933 | Edwards | |
| 2,878,992 | 3/1959 | Pickels et al. | 494/81 |
| 3,248,046 | 4/1966 | Feltman et al. | 494/16 |
| 3,262,231 | 7/1966 | Polch | 51/206 |
| 3,361,343 | 1/1968 | Lerner | 233/26 |
| 3,363,479 | 1/1968 | Pickels | 74/572 |
| 3,420,437 | 1/1969 | Blum et al. | 233/26 |
| 3,602,066 | 8/1971 | Wetherbee | 74/572 |
| 3,602,067 | 8/1971 | Wetherbee | 74/572 |
| 3,747,842 | 7/1973 | Grubb et al. | 494/16 |
| 3,788,162 | 1/1974 | Rabenhorst et al. | 74/572 |
| 3,794,241 | 2/1974 | Szentesi | 494/16 |
| 3,797,737 | 3/1974 | Kadotani et al. | 233/27 |
| 3,877,634 | 4/1975 | Rohde et al. | 233/14 R |
| 3,901,658 | 8/1975 | Burtis et al. | 494/16 |
| 3,913,828 | 10/1975 | Roy | 494/81 |
| 3,964,341 | 6/1976 | Rabenhorst | 74/572 |
| 3,982,447 | 9/1976 | Rabenhorst | 74/572 |
| 3,982,691 | 9/1976 | Schlutz | 494/81 |
| 3,993,243 | 11/1976 | Dietzel et al. | 494/81 |
| 3,997,106 | 12/1976 | Baram | 494/81 |
| 4,000,665 | 1/1977 | Rabenhorst | 74/572 |
| 4,020,714 | 5/1977 | Rabenhorst | 74/572 |
| 4,023,437 | 5/1977 | Rabenhorst | 74/572 |
| 4,036,080 | 7/1977 | Friedericy et al. | 74/572 |
| 4,039,006 | 8/1977 | Inone et al. | 138/129 |
| 4,093,118 | 6/1978 | Sinn et al. | 233/26 |
| 4,098,142 | 1/1978 | Weyler, Jr. | 74/572 |
| 4,102,220 | 7/1978 | Brobeck | 74/572 |
| 4,116,018 | 9/1978 | Weible | 64/12 |
| 4,123,949 | 11/1978 | Knight et al. | 74/572 |
| 4,138,286 | 2/1979 | Chevrolat et al. | 156/172 |
| 4,160,521 | 7/1979 | Lindgren | 494/81 |
| 4,176,563 | 12/1979 | Younger | 74/572 |
| 4,183,259 | 1/1980 | Giovachini et al. | 74/572 |
| 4,186,245 | 1/1980 | Gilman | 428/635 |
| 4,187,699 | 2/1980 | Weible | 64/12 |
| 4,198,878 | 4/1980 | Lewis et al. | 74/572 |
| 4,207,755 | 6/1980 | Weible | 64/15 B |
| 4,207,778 | 6/1980 | Hatch | 74/572 |
| 4,237,175 | 12/1980 | Kobayashi | 428/192 |
| 4,244,240 | 1/1981 | Rabenhorst | 74/572 |
| 4,266,442 | 5/1981 | Zorzi | 74/572 |
| 4,285,251 | 8/1981 | Swartout | 74/572 |
| 4,327,661 | 5/1982 | Boeckel | 118/52 |
| 4,341,001 | 7/1982 | Swartout | 29/159 |
| 4,359,912 | 11/1982 | Small | 74/572 |
| 4,370,899 | 2/1983 | Swartout | 74/572 |
| 4,375,272 | 3/1983 | Sutton | 494/16 |
| 4,408,500 | 10/1983 | Kulkarni et al. | 74/572 |

(List continued on next page.)

FOREIGN PATENT DOCUMENTS

| | | | |
|---|---|---|---|
| 473870 | 5/1951 | Canada | 494/81 |
| 0081968 | 6/1983 | European Pat. Off. | |
| 513713 | 11/1930 | Fed. Rep. of Germany | |
| 957046 | of 1957 | Fed. Rep. of Germany | 74/572 |

(List continued on next page.)

Primary Examiner—Richard E. Moore
Assistant Examiner—Vinh Luong

[57] ABSTRACT

A centrifuge rotor includes a central disc formed of a plurality of laminates each having an array of fibers arranged at predetermined annular orientations with respect to the axes of the fibers in the next vertically adjacent laminate. A rim having a higher stiffness than that of the disc surrounds the disc so that a radially inwardly compressive stress is imposed on the disc by the rim when the rotor is rotated at any speed.

6 Claims, 3 Drawing Sheets

U.S. PATENT DOCUMENTS

| | | | |
|---|---|---|---|
| 4,412,973 | 11/1983 | Guigan | 494/16 |
| 4,413,860 | 11/1983 | Prescott | 301/63 |
| 4,443,727 | 4/1984 | Annen et al. | 74/572 |
| 4,449,965 | 5/1984 | Strain | 494/16 |
| 4,451,250 | 5/1984 | Romanauskas | 494/85 |
| 4,458,400 | 7/1984 | Friedericy et al. | 29/159.3 |
| 4,460,351 | 7/1984 | Wakita et al. | 494/16 |
| 4,468,269 | 8/1984 | Carey | 156/175 |
| 4,481,840 | 11/1984 | Friedericy et al. | 74/572 |
| 4,502,349 | 3/1985 | Abiven et al. | 74/572 |
| 4,553,955 | 11/1985 | Lam et al. | 494/16 |
| 4,568,325 | 2/1986 | Cheng et al. | 494/16 |
| 4,586,918 | 5/1986 | Cole | 494/81 |
| 4,589,864 | 5/1986 | Cole | 494/20 |
| 4,675,001 | 6/1987 | Johanson | 494/85 |

FOREIGN PATENT DOCUMENTS

| | | | |
|---|---|---|---|
| 2746877 | 4/1979 | Fed. Rep. of Germany | 494/81 |
| 3346289 | 7/1984 | Fed. Rep. of Germany | 494/81 |
| 2292898 | 6/1976 | France . | |
| 2360008 | 2/1978 | France . | |
| 2538719 | 7/1984 | France . | |
| 57-6143 | 1/1982 | Japan . | |
| 57-195945 | 12/1982 | Japan | 74/572 |
| 58-30548 | 2/1983 | Japan | 74/572 |
| 5512943 | 5/1985 | Japan . | |
| 794277 | 1/1981 | U.S.S.R. | 74/572 |
| 1174615 | 8/1985 | U.S.S.R. . | |
| 23742 | of 1898 | United Kingdom | 74/572 |
| 0505446 | 5/1939 | United Kingdom . | |
| 2097297 | 11/1982 | United Kingdom . | |

FIBER REINFORCED CENTRIFUGE ROTOR

This application is a continuation, of application Ser. No. 805,708 filed 12/6/85, now abandoned.

BACKGROUND OF THE INVENTION

1. Field of the Invention

This invention relates to an ultracentrifuge rotor and, in particular, to an ultracentrifuge rotor fabricated of a composite material.

2. Description of the Prior Art

In order to increase centrifugal load carrying capability the manufacture of rotating structures has evolved from the use of homogeneous materials such as aluminum and titanium toward the use of composite materials. The use of such composite materials has become especially apparent in the area of flywheel storage structures. Exemplary of rotating energy storage structures using composites are U.S. Pat. No. 4,481,840 (Friedericy et al., flywheel having elastic spokes carrying an elastic rim), U.S. Pat. No. 4,408,500 (Kulkarni eta al., flywheel body enclosed by a circumferentially wound fiber rim), U.S. Pat. No. 4,370,899 (Swartout, flywheel having glass annulus surrounded by a fiber rim), U.S. Pat. No. 4,266,442 (Zorzi, flywheel with cross-ply composite core and relatively thick rim), and U.S. Pat. No. 4,207,778 (Hatch, reinforced cross-ply composite flywheel).

It is believed advantageous to obtain the benefits attendant with the use of composite structure in fabricating ultraspeed centrifuge rotors.

SUMMARY OF THE INVENTION

The present invention relates to an ultracentrifuge rotor fabricated of a relatively thick central disc member formed of composite material. A plurality of sample receiving cavities is arranged in an annular array adjacent to the periphery of the central disc. A compressive rim formed of a hoop wound, carbon fiber-reinforced, plastic material having a higher stiffness than the central disc surrounds the periphery of the disc. Both the periphery of the disc and the inner diameter of the rim are fabricated with conforming slightly polygonal shapes. The rim and disc are assembled with adhesive bonds located therebetween only in the areas of the sample receiving cavities. When at speed, due to the disparity in stiffnesses, the rim will tend to deflect to generate inwardly directed radial force applied to the disc in the area of each sample cavity. A drive fitting is adhesively bonded in any suitable manner to the underside of the disc whereby the rotor may be disposed in a driven relationship with a source of motive energy.

BRIEF DESCRIPTION OF THE DRAWINGS

The invention may be more fully understood from the following detailed description thereof taken in connection with the accompanying drawings which form a part of this application and in which.

DETAILED DESCRIPTION OF THE INVENTION

Figure 1:
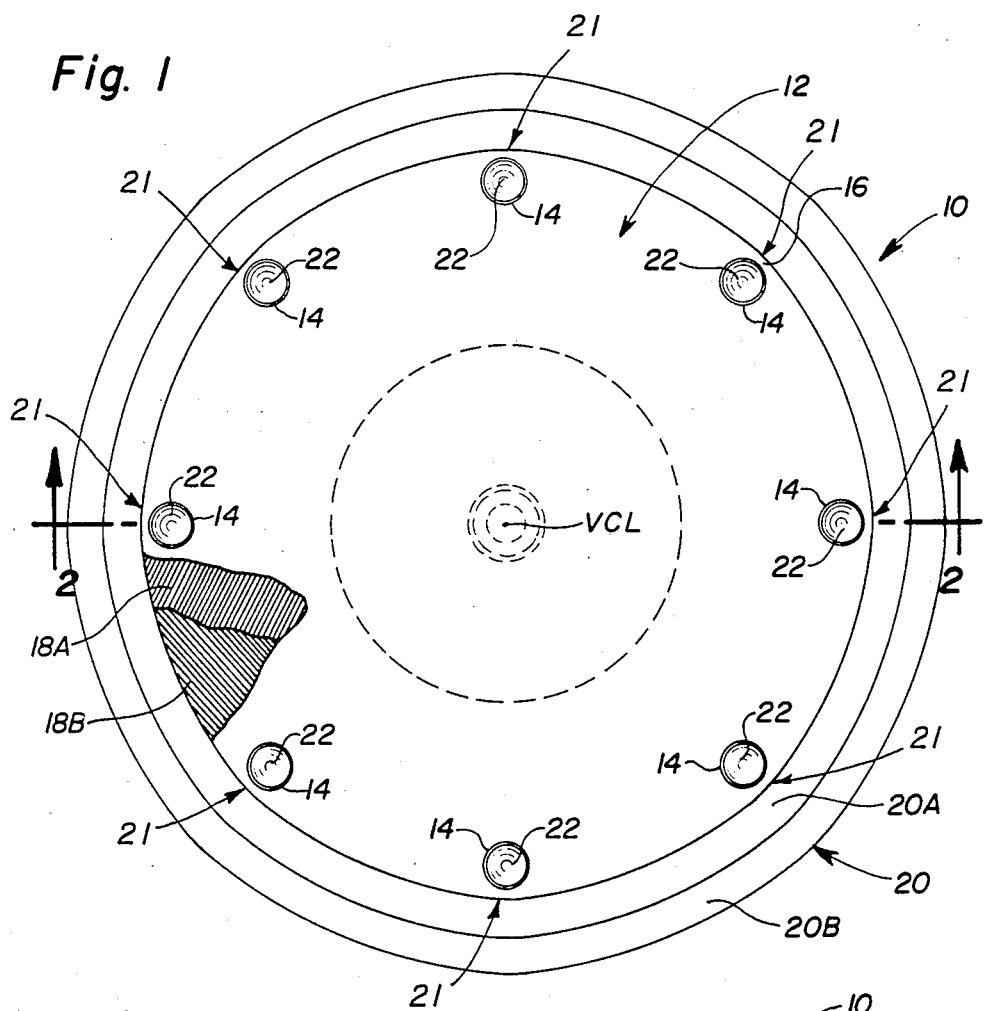
FIG. 1 is a plan view of one embodiment of an ultracentrifuge rotor formed in accordance with the present invention with portions of the disc member broken away for clarity to illustrate the orientation of the fibers in each lamina.

Throughout the following detailed description similar reference numerals refer to similar elements in all figures of the drawings.

With reference to the figures shown is an ultracentrifuge rotor generally indicated by reference character 10 in accordance with the present invention. The rotor 10 is rotatable at speeds in excess of 20,000 revolutions per minute about a central axis of rotation VCL.

The rotor 10 includes a central disc 12 of substantially uniform height. The disc 12 is polygonal and not truly circular in perimetric configuration. An array of sample container receiving cavities 14 is arranged in any predetermined arrangement in the disc 12. Preferably the cavities 14 are arranged in a generally annular array adjacent to the periphery of the disc 12. The cavities 14 lie within a predetermined close dimension 16 to the periphery of the disc 12. The sample receiving cavities 14 are shown in the Figures as arranged with their axes 14A parallel to the central vertical axis VCL of the rotor 10 although the axes 14A may be inclined with respect to the axis VCL and remain within the contemplation of the present invention.

Figure 3:
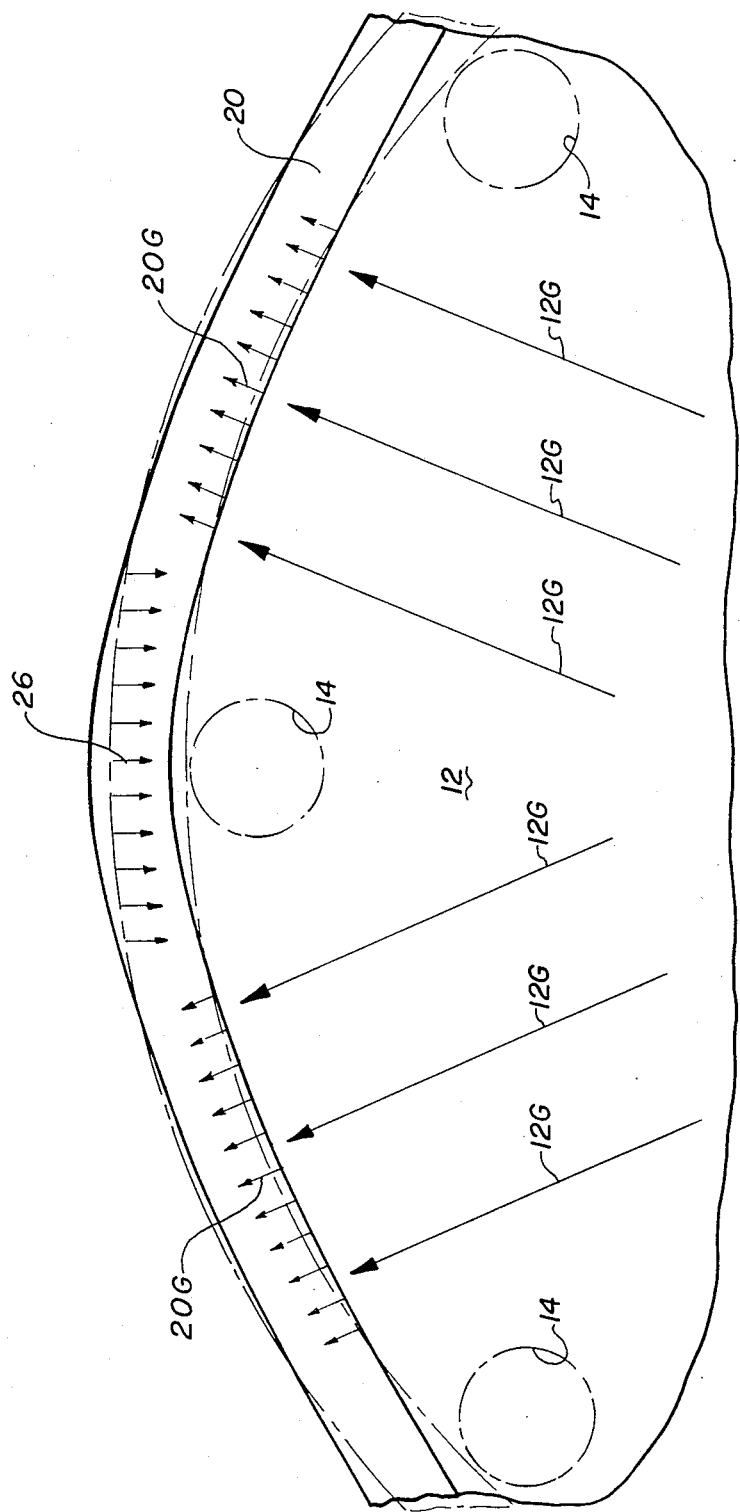
FIG. 3 is a highly stylized diagram of the forces acting on the disc member by the band with the rotor of FIG. 1 at speed.

In one embodiment of the invention shown in FIGS. 1 and 3 the cavities 14 are formed in the disc 12 in the vicinity of the points of the polygon that defines the perimeter of the disc. In an alternate embodiment shown in FIGS. 4 and 5 the cavities 14 area arranged in the disc 12 substantially midway between the points of the polygon.

Figure 2:
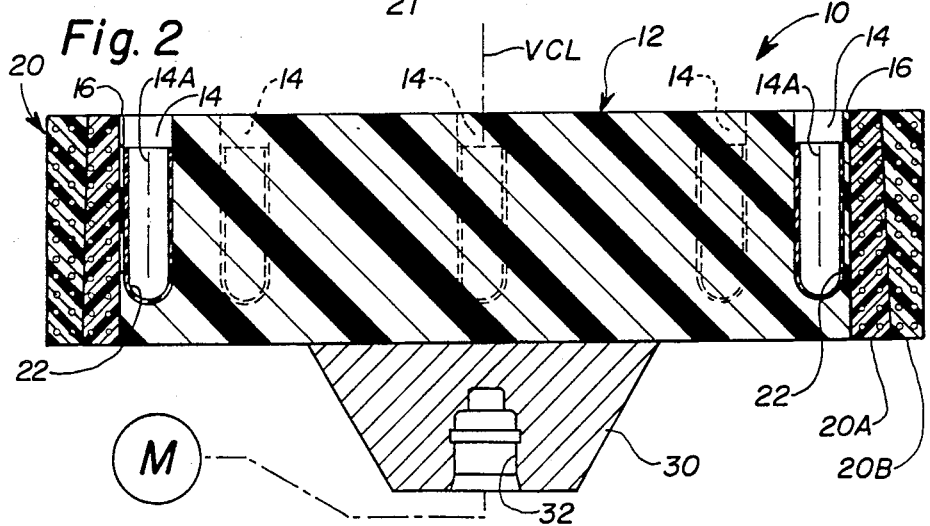
FIG. 2 is a typical side elevations view of the ultracentrifuge rotor shown in FIGS. 1 and 4.

The disc 12, although shown in FIG. 2 as an integrated structure for purposes of illustration, is formed, in fact, as a laminate of a plurality of laminae 18 of unidirectional preimpregnated composite fiber-resin material. The fibers in each lamina 18 are, as seen from the broken portion of FIGS. 1 and 4, formed with the axes of each of the fibers in a given lamina 18A being angularly offset from the fibers in a vertically adjacent lamina 18B. The disc 12 is formed by layering the laminae in a symmetric manner and thereafter curing the same. "Symmetric" is meant to convey the idea that the orientation of the axes of the fibers in the laminae above a central lamina is mirrored in the orientation of the axes of the fibers in the laminae below that central laminae.

The hub or disc 12 is surrounded by a filament would, high strength fiber-reinforced composite rim 20. The rim 20 may in practice be formed from a nested array of plurality of rings of which two such rings, 20A, 20B, are shown. The rings 20A, 20B, etc., are interference fit together. The thickness of the rim 20 is exaggerated in the Figures for clarity of illustration. The rim 20 has an conforming polygonal configuration on its inner perimeter. As will be developed, the rim 20, in a manner to be described, assists in generating a radially inwardly directed force which prevents the individual fluid sample containers, such as the containers 22, disposed within the cavities 14 from punching their way through the edge of the disc 12. It should be understood that the rim 20 may also be wound as an integral member or may be provided by any other convenient fabrication method and remain within the contemplation of this invention.

A drive fitting 30 (in this case fabricated of titanium) is suitably connected to the underside of the disc 12. The fitting 30 is provided a recess 32 which is adapted to receive a drive spud whereby the rotor may be connected to a source M of motive energy.

Although any suitable composite fiber material may be utilized, it is preferred that the laminae which form the disc use aramid fibers such as that sold by E. I. du Pont de Nemours and Company under the trademark "Kevlar." Similarly, fiber reinforcement for the rim may be formed of any composite material although either a carbon-epoxy or aramid-epoxy fiber material is preferred.

Both the disc 12 and the rim 14 have a predetermined set of physical properties associated therewith which serves to determine the magnitude to which each of those bodies would deflect radially outwardly due to various applied forces. These properties may be collectively termed the "stiffness" of the disc or rim, as the case may be. Those skilled in the art may readily appreciate the various properties which contribute to the stiffness of the hub and rim, e.g., modulus of elasticity, density, cross section area, and radius, as well as the factors which apply force to these members, e.g., centrifugal force, body load, and preload. The stiffness of the disc 12 and the rim 14 are selected such that any radial growth of the rim should be less than and at most equal to that of the disc.

Figure 4:
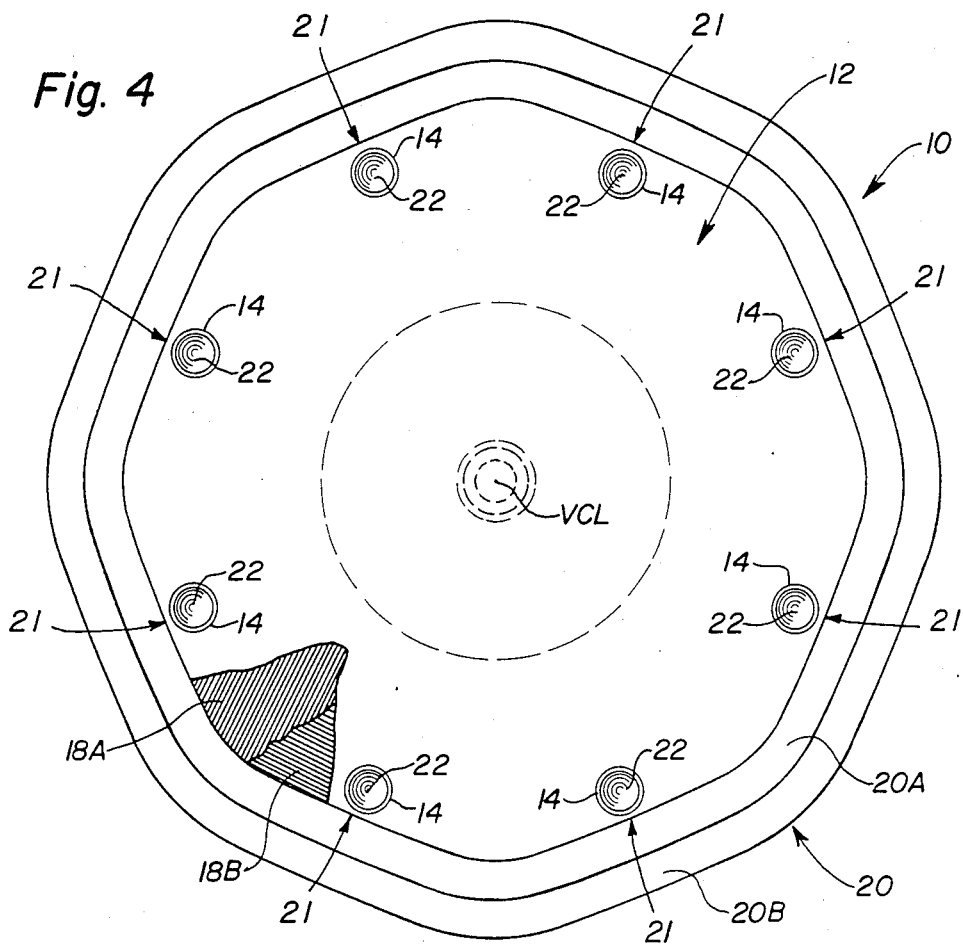
FIGS. 4 and 5 are views respectively similar to FIGS. 1 and 3 illustrating an alternate embodiment of a rotor in accordance with the present invention.

Since the disc 12 has a different stiffness than that of the rim 20 compressive stresses will be generated along the interface bond line between these elements at any rotating speed. This is desirable so that the bond line will not develop catastrophic fractures while in service. The compressive rim-disc stress is increased by providing both the rim 20 and the outer peripheral surface of the disc 12 with their slightly polygonal shapes. The rim 20 an the disc 12 would then be assembled with adhesive bond lines, as is generally indicated in FIGS. 1 and 4 by reference characters 21 cavities generally indicated in FIGS. 1 and 4 by the thickened lines at reference character 21.

Figure 5:
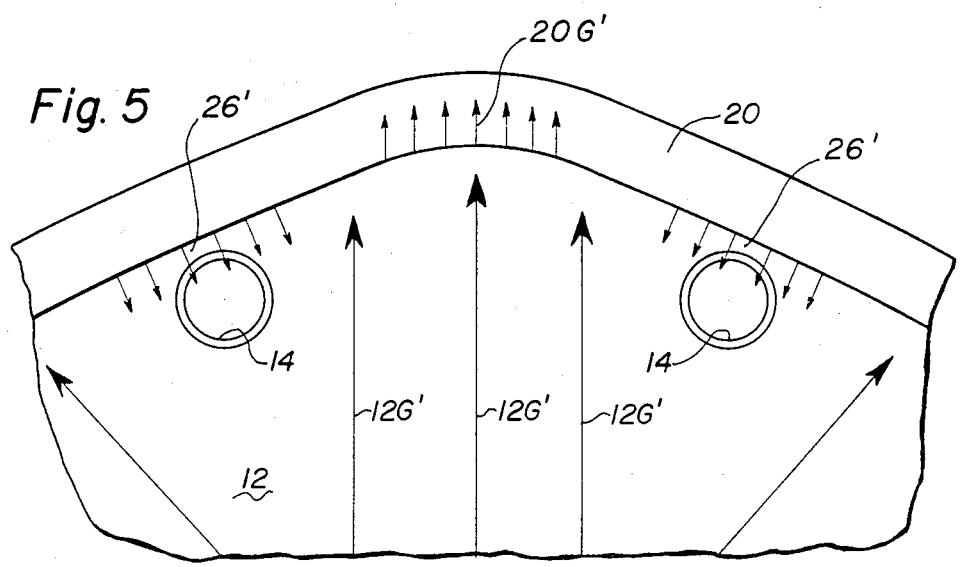

The operation of a rotor in accordance with the present invention may be understood from reference to FIGS. 3 and 5. In FIG. 3 the cavities 14 are located at the points of the polygon of the disc 12. When the rotor is at speed the disc 12 and the rim 20 deflect radially outwardly, as shown by the arrows 12B, 20G, respectively. Due to the disparity in stiffnesses the deflection of the disc 12 would, if uninhibited, grow faster than the rim 20. The combination of centrifugal force and the disparate stiffnesses in the disc and rim causes the rim 20 and the disc 12 to deflect into truly circular shape (shown in dashed lines in FIG. 3). This results in an additional inward radial force 26 being applied to the disc 12 in the area of each cavity 14. As a result of the increased inwardly directed compressive force 26 the cavities 14 may be placed closer to the rotor periphery than would normally be the case. Thus for a given sized rotor an increase in relative centrifugal force (RCF) may be expected. Alternatively a given RCF may be achieved with a small diameter rotor.

In the embodiment of the invention shown in FIG. 5, wherein the cavities 14 are disposed midway between the points of the polygon, when the rotor is at speed, the relatively more massive portions of the disc 12 in the vicinity of the points of the polygon generate increased growth forces 12G' which are imposed on the rim 20. In response to the radially inwardly directed force 26' is generated within the rim 14 substantially midway between the points of the polygon, thus again compressing that portion of the disc 12 in which the cavities are disposed.

Those skilled in the art having the benefit of the teachings of the present invention may effect numerous modifications thereto. These modifications are, however, to be construed as lying within the scope of the present invention as defined by the appended claims.

What is claimed is:

1. A centrifuge rotor comprising:
   a central disc having a predetermined stiffness associated therewith, the disc having a periphery thereon and an array of sample receiving cavities therein, the disc being a laminated structure comprising a plurality of isotropic fiber laminates each having an axis with the axes of each fiber in each vertically adjacent laminate being offset by a predetermined angular amount from the axis of each fiber in the next adjacent laminate and
   a reinforcing rim disposed circumferentially about the periphery of the disc, the rim having an inner diameter and also having a predetermined stiffness associated therewith,
   both the periphery of the disc and the inner diameter of the rim each being polygonal in shape, the rim and the disc being adhesively bonded only adjacent to those regions of the disc wherein the sample receiving cavities are disposed, the disparity in physical properties in the disc and the rim being such that rotation of the rotor generates a radially inwardly directed compressive force imposed by the rim on the disc in the vicinity of the cavities therein.

2. The rotor of Claim 1 wherein the polygon has a plurality of points and the sample receiving cavities are disposed in the vicinity of the points of the polygonal disc.

3. The rotor of Claim 1 wherein the polygon has a plurality of points and the sample receiving cavities are disposed between the points of the polygonal disc.

4. The rotor of claim 1 further comprising a drive fitting attached to the underside of the disc.

5. The rotor of claim 2 further comprising a drive fitting attached to the undersurface of the disc.

6. The rotor of claim 3 further comprising a drive fitting attached to the undersurface of the disc.

* * * * *